J. M. PERKINS.
Attaching Hubs to Axles.

No. 12,871.    Patented May 15, 1855.

UNITED STATES PATENT OFFICE.

JOHN M. PERKINS, OF NEW YORK, N. Y.

MODE OF ATTACHING HUBS TO AXLES.

Specification of Letters Patent No. 12,871, dated May 15, 1855.

*To all whom it may concern:*

Be it known that I, JOHN M. PERKINS, of the city, county, and State of New York, have invented a new and Improved Mode of Attaching Hubs to Axles; and I do hereby declare that the following is a full, clear, and exact description of the same, reference being had to the annexed drawings, making a part of this specification, in which—

Figure 1:
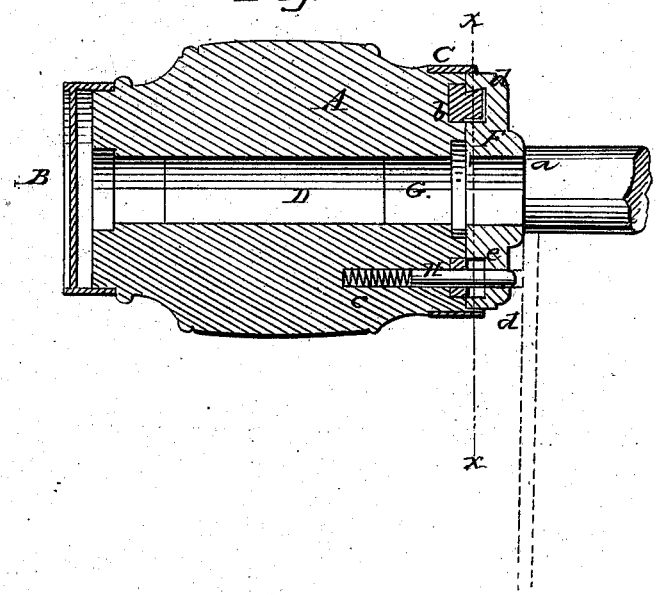
Figure 2:
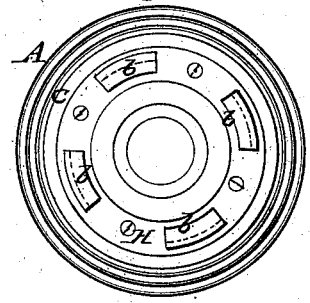
Figure 3:
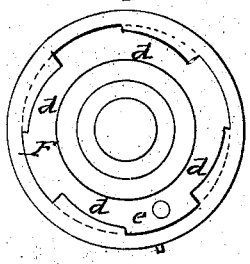
Figure 4:
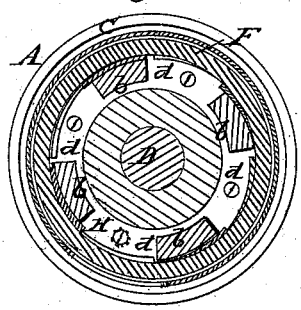

Figure 1, is a longitudinal section of a hub attached to an axle according to my improved mode. Fig. 2, is a back view of the hub. Fig. 3, is a view of the inner side of the cap. Fig. 4, is a section of the cap and flanches attached to the back end of the hub, $(x)$ $(x)$ showing the plane of section.

Similar letters of reference indicate corresponding parts in the several figures.

The nature of my invention consists in the peculiar means employed for securing the hub to the axle.

A, represents the hub of usual construction and having its front end covered permanently by a plate B, and a band C, attached to the back end of its periphery.

D, represents the arm of the axle E, and F, represents a circular cap which is fitted loosely on the arm D, adjoining the shoulder $(a)$ of the axle, said cap being secured in proper place upon the arm by a collar G, as shown in Fig. 1.

To the back end of the hub A, there is attached four, more or less, segment projections $(b)$ the outer edges of which, are creased or grooved as shown in Fig. 1, and also inclined or beveled longitudinally as shown in Figs. 2 and 4. There is also inserted a pin H, in the back end of the hub the inner end of which bears against a spiral spring $(c)$.

The inner surface of the cap F, is provided at its edge with four lips $(d)$, the number of lips corresponding with the number of projections $(b)$, these lips project inward or toward the center of the plate F, and their inner sides are beveled to correspond inversely with the creases or grooves in the outer edges of the projections $(b)$, see Fig. 1. The edges of the lips are also inclined to correspond with the outer edges of the projections $(b)$ see Fig. 3. Through the cap F, there is made a hole $(e)$ to receive the pin H.

To attach the hub to the axle the cap E, is placed against the back end of the hub A, the lips $(d)$ being between the projections $(b)$ see Fig. 4. The cap is then turned from left to right and the lips pass over the outer edges of the projections $(b)$ and the pin H, passes into the hole $(e)$, see red lines Fig. 4. The pin H, prevents the lips $(d)$ from passing off the projections $(b)$ when the vehicle is moved backward.

To detach the hub from the axle, the pin H, is forced back free from the cap F, by means of a key, shown in red Fig. 1.

The above invention is extremely simple, efficient, and economical to manufacture, and the wheel may be readily attached to and detached from the axle.

What I claim as new and desire to secure by Letters Patent, is,

Attaching hubs to axles by having segment projections $(b)$ attached to the back end of the hub, and lips $(d)$ on the inner surface of a cap F, which is placed loosely on the arm of the axle, said lips being fitted over the projections by turning the cap, and prevented from moving off of the projections upon the backward movement of the wheel or vehicle by the pin H, as herein shown and described.

JNO. M. PERKINS.

Witnesses:
 JOS. GEO. MASON,
 I. W. COMBS.